Patented July 29, 1930

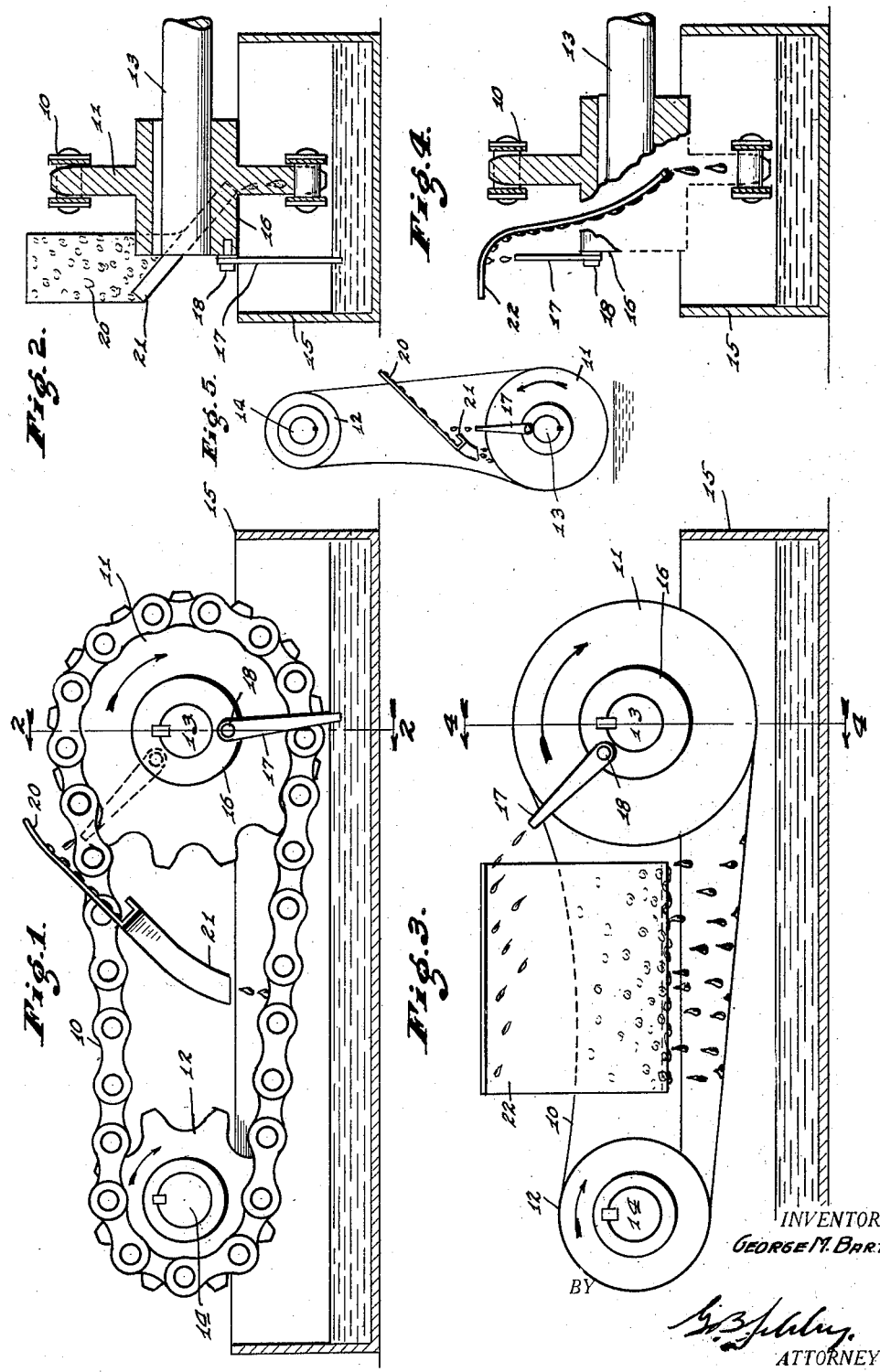
July 29, 1930. G. M. BARTLETT 1,771,835
CHAIN OILER
Filed May 10, 1926
INVENTOR.
GEORGE M. BARTLETT,
BY
ATTORNEY.

1,771,835

UNITED STATES PATENT OFFICE

GEORGE M. BARTLETT, OF INDIANAPOLIS, INDIANA, ASSIGNOR TO DIAMOND CHAIN AND MANUFACTURING COMPANY, OF INDIANAPOLIS, INDIANA, A CORPORATION OF INDIANA

CHAIN OILER

Application filed May 10, 1926. Serial No. 107,964.

My invention relates to means for lubricating chain drives in which the speed of the chain is so high that it is impracticable to permit the running of the chain in an oil bath. Various means have heretofore been proposed for accomplishing this result, but they have usually possessed disadvantages in that they either require precise regulation and constant attention or they create a fine mist of oil which it is difficult to control or to keep within proper bounds.

It is the object of my invention to produce a device for lubricating a drive chain, which device will not possess the undesirable features mentioned above but which will supply oil in sufficient quantities to the inside or working surface of the chain. A further object of my invention is to so construct such a device that it will be economical to manufacture, easy to install, and free from a multiplicity of moving parts.

I accomplish the above objects by providing beneath one of the sprockets on which the chain runs an oil bath the level of the oil in which is below the sprocket and chain, and I mount on the sprocket one or more fingers adapted to dip into the oil at each revolution of the sprocket and to pick up some of such oil which is later thrown against a drip plate and conducted to the chain or sprocket, preferably to the upper side of the lower stretch of the chain.

The accompanying drawing illustrates my invention: Fig. 1 is a side elevation of a chain drive showing the oil tank in section; Fig. 2 is a section on the line 2—2 of Fig. 1; Fig. 3 is a view similar to Fig. 1 showing the sprockets and chain diagrammatically and a different means for conducting oil to the inner surface of the chain; Fig. 4 is a section on the line 4—4 of Fig. 3 with part of the sprocket broken away to show the construction of the drip plate; and Fig. 5 is a diagrammatic view illustrating a modification of my invention.

In the drawing a chain 10 connects two sprockets 11 and 12 which are secured respectively to shafts 13 and 14. The sprockets 11 and 12 rotate in the direction indicated by the arrows so that the lower stretch of the chain 10 moves in a direction away from the sprocket 11.

Located below the sprocket 11 and conveniently extending under the complete chain drive is a tank 15 adapted to contain a supply of oil for the chain. The oil in this tank is maintained at a level below the sprockets and chains so that these parts will not drip into the oil.

At some convenient point on the sprocket 11, conveniently at the end of the hub 16 of such sprocket, there is mounted a finger 17 of sufficient length to extend outward beyond the periphery of the sprocket so that it will dip into the oil in the tank 15 at each revolution of the sprocket. For a reason which will be hereinafter set forth, it is desirable that the finger 17 be movably mounted on the sprocket 11 in such a manner that it will assume a substantially radial position when the sprocket is rotating but will be free to move angularly out of its normal radial position; although this is not essential to my invention in its broader aspects.

The finger 17 is shown in the drawing as pivotally mounted on the end of the hub 16 by means of a pin or screw 18. With the finger so mounted, centrifugal force causes it to assume a normal radial position as the sprocket 11 rotates. When the outer end of the finger dips into and passes into the oil in the tank 15, the finger lags angularly behind the sprocket owing to the resistance imposed by the oil, and so agitates the body of oil less violently than if it were rigid with the sprocket. When the finger leaves the oil, it swings rapidly forward at an increased velocity, and more effectively throws off the oil which it has picked up in its passage through the oil bath.

Arranged in position to receive the oil thrown off from the finger 17 when it emerges from the oil bath, is a suitable means for conducting such oil to the upper side of the lower stretch of the chain 10.

In Figs. 1 and 2 I have illustrated this means as consisting of a plate 20 to the lower edge of which is affixed an inclined trough 21 which conducts oil from the under surface of the plate 20 to the lower stretch of the chain 10.

In Figs. 3 and 4, the trough 21 is omitted and a curved plate 22 is mounted in position to receive the oil thrown off from the finger 17. The oil striking the under side of the plate 22 adheres thereto, runs down such plate and drips from the lower edge of the plate onto the chain 10.

In certain instances it may be desirable to substitute for the above described oiling means, which apply oil to the inner, or sprocket-engaging, face of the chain, a construction arranged to apply oil to the sprocket teeth rather than to the chain. One such construction is shown applied to the chain drive illustrated in Fig. 5, in which it is impracticable to apply oil to the inner face of the chain, as in neither of the chain stretches is such inner face uppermost. In the construction shown in Fig. 5 a finger 17, a drip-plate 20, and a trough 21 are used, such parts being similar to the correspondingly numbered parts in Fig. 1, but a somewhat different arrangement of these parts is used. The drip-plate 20 is located above the sprocket 11 in position to receive oil thrown from the finger 17; but the trough 21, instead of conducting oil to the chain, conducts it to the sprocket so that it falls on the teeth thereof and thus lubricates the wearing surfaces of the chain and sprocket.

By my invention the chain 10 is provided with an adequate amount of oil and this oil is supplied to the inner or working surface of the chain. The level of oil in the tank 15 need not be closely regulated as it is only necessary that the level of the oil be high enough so that the finger 17 will pass below it and low enough so that the chain and sprocket will be above it. As there are no moving parts continuously running in the oil, the oil is not churned to produce an undesirable mist or spray, and it is therefore unnecessary to enclose the chain and sprocket completely.

I claim as my invention:

1. In combination with a chain drive comprising two rotatable sprockets and a chain interconnecting them, a finger mounted to rotate with one of said sprockets, a supply of oil arranged below said finger in such a position that said finger will dip into it during a portion of the sprocket revolution, and a drip plate for receiving on its lower side oil thrown from said finger and for conducting such oil to the inner surface of said chain.

2. In combination with a chain drive comprising two rotatable sprockets and a chain interconnecting them, a finger pivotally mounted on one of said sprockets on an axis eccentric to the sprocket axis, said finger being freely swingable about its axis of pivotal mounting, a supply of oil arranged below said finger in such a position that such finger will dip into it during a portion of the sprocket revolution, said sprockets and chain being located wholly above the level of said oil supply, and a drip plate for receiving on its lower side oil thrown from said finger immediately after it emerges from said oil supply and for conducting such oil to said chain.

In witness whereof, I have hereunto set my hand at Indianapolis, Indiana, this 6th day of May, A. D. one thousand nine hundred and twenty-six.

GEORGE M. BARTLETT.